United States Patent [19]
Rodgers et al.

[11] 3,832,472
[45] Aug. 27, 1974

[54] WHEAT PRODUCT

[75] Inventors: Nelson E. Rodgers, Wayzata; Jack R. Durst, Osseo, both of Minn.

[73] Assignee: The Pillsbury Company, Minneapolis, Minn.

[22] Filed: Mar. 17, 1972

[21] Appl. No.: 235,700

[52] U.S. Cl. .............................. 426/148, 426/199
[51] Int. Cl. .............................................. A23c 1/10
[58] Field of Search ................. 99/80 R, 93, 93 A; 426/148

[56] References Cited
UNITED STATES PATENTS

| 2,358,827 | 9/1944 | Rakowsky et al. | 99/93 |
| 2,930,699 | 3/1960 | Sollano et al. | 99/93 |
| 3,077,407 | 2/1963 | Rozsa et al. | 99/93 |

FOREIGN PATENTS OR APPLICATIONS

| 589,739 | 12/1959 | Canada | 99/93 A |

Primary Examiner—Raymond N. Jones
Attorney, Agent, or Firm—Michael D. Ellwein; James V. Harmon; Ronald E. Lund

[57] ABSTRACT

This wheat product comprises endosperm in which the cellular structure is completely disrupted and dispersed. The starch granules are free and unassociated with gluten protein particles. The granules are intact, ungelatinized and retain the native anisotropic structure. The gluten protein is metamorphosed to smoothly contoured particles containing very little starch and is substantially undenatured with respect to doughing function. Depending on intended use, the germ and aleurone fractions of the wheat grain can be excluded or included in the product. The product can be used as an aqueous dispersion or in a dried form.

14 Claims, 2 Drawing Figures

FIG. 2. COMPARISON OF DISTRIBUTION OF MASS EQUIVALENT OF VOLUME ($D^3$) OF PROTEIN PARTICLES IN ITH ENDOSPERM WITH DISTRIBUTION OF MASS IN FLOUR PARTICLES.

LEGEND
1. FINE FLOUR
2. AVERAGE BAKERS FLOUR
3. GRANULAR FLOUR
4. PROTEIN PARTICLES

FLOUR PARTICLES INCLUDE CELLS, STARCH, PROTEIN, ETC.

WHEAT PRODUCT

BACKGROUND OF THE INVENTION

The present invention relates to a wheat product derived by hydroprocess in which the starch granules are intact, ungelatinized and substantially unassociated with gluten protein. The gluten protein is in the form of smoothly contoured particles containing very little occluded starch. There are essentially no vestiges of the native cellular structure of the endosperm in this product.

The wheat kernel consists of three major structures: the endosperm, the husk, and the germ. In general terms, the husk comprises the outer branny layers enveloping the endosperm and the germ. Gluten-type proteins, the principal proteins in the endosperm, are distributed in the cells as a matrix in which granular starch is embedded. The aleurone is a dense layer of proteinrich, non-starchy cells overlying the main body of starchy endosperm and is botanically a part of the endosperm. Herein, however, the aleurone layer will be considered separately from the endosperm.

As compared to endosperm, the germ and aleurone are relatively rich in fat and protein. The albumin and globulin-type proteins are notably richer in the essential amino acid, lysine, than the gluten-type proteins predominating in the starchy endosperm. In terms of dry weight of the wheat kernel, the husk typically comprises 14.5 percent, the endosperm (including the aleurone) 83 percent and the germ 2.5 percent.

In conventional milling, wheat is ground between steel rollers and the husk, germ and aleurone layer are mechanically separated from the endosperm.

The endosperm is reduced to fine particles, ranging from small starch granules and particles of protein measuring 2 μm (micrometers) or less to chunks larger than 100 μm. In terms of mass, most of the endosperm is in the form of fragments, in which the cellular structure is partially intact and much of the starch is closely associated or occluded in the protein matrix. Some of the larger starch granules, particularly in the range 15–40 μm, are released. The large starch granules are subject to fracture or disorientation of internal structure during grinding. In many baking applications, excessive starch damage detracts from function of flour as an ingredient.

In dry milling, the husk is shattered into particles ranging widely in size. Likewise, the germ is partially fragmented and some fat is expressed into the endosperm. Ordinarily, where the flour represents extraction of fairly pure starchy endosperm, i.e., excluding the non-starchy aleurone, the yield of straight flour is around 72 to 74 percent of the wheat and a substantial amount of endosperm is carried into the husk and germ by-products. As the extraction is increased to 80 percent or more, progressively larger amounts of the husk and germ fractions appear in the flour. Excessive levels of husk and germ tissues limit utility of the flour in many applications.

Wheat flour is useful in leavened products, such as breads and cakes, because of its distinctive doughing properties. In general terms, "doughing" describes the phenomenon wherein flour particles admixed with water become a cohesive mass. As mixing is continued, the gluten develops into a resiliently extensible matrix. This protein matrix entraps and retains leavening gas bubbles and forms an expanded structure which persists through baking.

Several attempts have been made to change the characteristics of the product derived from wheat. Two notable examples are contained in U.S. Pat. Nos. 3,077,407 and 3,077,308. Even when these methods are utilized, protein adheres to the starch granules and some of the starch granules are broken or ruptured. The gluten protein is associated, to some degree with the starch granules and the portion that is not associated with starch granules exists in tiny fragments.

A primary object of this invention is to obtain a product derived from wheat wherein the starch granules are intact, ungelatinized and unoccluded by gluten protein.

A further object is to provide gluten protein in homogeneous smoothly contoured protein particles containing only minor amounts of occluded starch.

Another object is to provide gluten protein in a substantially undenatured state with respect to doughing function.

SUMMARY OF THE INVENTION

The product of this invention is derived from wheat and comprises homogeneous, smoothly contoured gluten protein particles and starch granules that are substantially intact, ungelatinized and unoccluded by gluten protein. The cellular structure of the wheat endosperm is completely disrupted. The starch granules can be characterized as anisotropic to polarized light, impermeable to congo red dye and resistant to attach by β-amylase enzymes. The gluten protein is characterized as substantially undenatured with respect to doughing function and having a particle size such that at least 90% of the weight of the protein is contained in particles not less than 50 μm in randomly measured dimension.

This product is derived by a process wherein a highly purified endosperm can be obtained in yields substantially greater than that attained by dry-milling wheat to flour of comparable purity. The product can be tailored to include only the starchy endosperm (excluding the aleurone layer) or to include the entire wheat kernel except the husk.

Two processes by which the product claimed herein can be processed are described in the following patent application and the following patent. Rodgers, et al., "Hydroprocessing of Wheat," Ser. No. 154,532 filed June 18, 1971 now abandoned; and Durst, et al., "Hydromilling of Wheat," U.S. Pat. No. 3,788,861, both of which are incorporated by reference in their entirety.

DESCRIPTION OF THE DRAWINGS

FIG. 1 is a graph of the cumulative distribution of size of protein particles in the product of this invention. This graph is drawn on probability coordinates.

This product can readily be made with substantially no aleurone or germ present in the finished product (see Rodgers, et al., Serial No. 154,532, supra). One measure of separation of germ is the lipid content of the finished product. The ether-extractable lipid content of this product, without germ or aleurone, is generally below 0.50 percent by weight of the product on a dry basis and, preferably, below 0.40 percent. Conventional dry-milled flour usually contains about 1.25 percent lipids by weight.

For some applications the germ and aleurone can be advantageously used. Both the germ and the aleurone layer contain albumin and globulin proteins which are rich in lysine. Inclusion of these components in flour can reduce the lysine deficiency of conventional flour. See "Proteins as Human Food," (ed. Laurie 1970) The Avi Publishing Company. However, inclusion of the germ by conventional methods can cause odor problems due to rancidification of the oil in the germ.

This particular problem has been solved by hydroprocessing the wheat as shown in Durst, et al., U.S. Pat. No. 3,788,861, supra. The albumin and globulin proteins are solubilized and, in that state are excellent film formers. These film formers are instrumental in encapsulating the oil from the germ as well as other oils added during processing. Because the oils are encapsulated, there is no problem witth rancidification, the yield of usable product from the wheat is increased, and the product so obtained is better balanced nutritionally than conventional dry-milled white flour.

Additional oil can be added to this product in amounts from 0.005 to 4.0 parts by weight oil per part by weight wheat, and preferably from 0.01 to 0.05 parts by weight oil per part by weight wheat. Oil in these amounts is encapsulated by the albumin and globulin proteins and no problems are encountered with rancidification.

Any edible oil having a melting point below about 104° F. can be utilized in this product. It is, of course, preferred that high quality, stable oils be utilized herein to minimize rancidity problems prior to encapsulation. Representative of the oils that can be utilized herein are coconut oil, corn oil, palm oil, olive oil, safflower oil, soybean oil, sunflower oil, peanut oil and cottonseed oil. Any of the synthetically derived oils having a melting point below 104° F. can also be utilized herein.

This product can, therefore, contain practically all of the germ and aleurone, thus enhancing the lysine content. The fat content is also raised when compared with dry-milled flour without encountering problems with rancidification of those fats. The yield of product is significantly raised by inclusion of the germ and aleurone without adversely affecting product quality.

The Husk

Essentially all of the husk is removed from this product. Because the husk is highly hydrated during processing, it is pliable and has little tendency to shatter. The husk, therefore, remains as fairly large pieces easily separable from the dispersed endosperm by vibratory screens, screening centrifuges or the like.

Functionality

The product of this invention can be utilized in baking or it can be separated into its component parts (primarily starch and gluten protein). When utilized in baking bread, the physical qualities and palatability compare favorably with conventional bread.

This product can be used in a wide variety of dough or batter products including bread, rolls, biscuits, pancakes, waffles, breadings and like products. It is especially advantageous for use in refrigerated doughs since the doughs can be prepared directly from aqueous dispersions rather than by hydration of flour.

Processing Methods

The product of this invention can be processed from wheat by at least two methods. The first method is described in detail in Rodgers, et al., "Hydroprocessing of Wheat," Ser. No. 154,532, supra. In that method, wheat is first steeped in an acidic steeping medium until the wheat has sorbed steeping medium equivalent to 63 to 71 percent by weight of the wheat. The wheat is then macerated to split the husk and expose the endosperm.

The wheat components are dispersed in an aqueous medium while maintaining the pH at between 2.4 and 3.4. The husk and germ are then separated from the endosperm and the pH of the endosperm is readjusted to between 4.5 and 6.5. Throughout this process, the starch granules are maintained in an intact and ungelatinized form and the gluten protein is dispersed and substantially undenatured with respect to doughing function. The cellular structure of the wheat is completely disrupted and the starch and protein particles are separately dispersed. The gluten protein is physically metamorphosed to particles that are homogeneous and smoothly contoured and ranging in size such that at least 90 percent by weight of the protein is contained in particles more than 50 $\mu$m in randomly measured dimension.

The second method is described in detail in Durst, et al., "Hydromilling of Wheat," U.S. Pat. No. 3,788,861, supra. In this process, the entire wheat kernel is ground in an aqueous medium at a temperature of not over 104° F. The husk or bran is then separated from the mixture of endosperm and germ after which some of the water is removed. Prior to grinding, it is preferred that the polyphenol oxidase activity be reduced below 9 activity units. The starch granules are maintained in an intact ungelatinized form and the gluten protein is substantially undenatured with respect to doughing function. The cellular structure of the wheat is disrupted and the starch and protein particles exist independently of each other. The pH is not substantially altered in this process. The protein particles are similar to those described in the immediately preceding paragraph.

The following specific examples are given to further explain and illustrate this invention. The examples are not intended to limit the scope of this application in any way.

EXAMPLE I

Three samples of the wheat product of this invention which contain essentially no germ, no aleurone or husk were obtained by the following method. Hard, red winter wheat was hydroprocessed in a system adapted for batch steeping and continuous separation of endosperm from husk and germ, using a two-stage centrifugal screen separation without recycle of the dispersing medium.

The wheat, containing 11.5 percent moisture, was steeped in 150 mN hydrochloric acid for 24 hours at 37° C. to 65 percent sorption by weight. The steeping medium was circulated continuously by percolation through the bed of wheat and the underflow was pumped through a heat exchanger to the top of the bed. Final pH of the steeping medium was about 1.7.

The drained wheat was macerated in a Moyno pump at the rate of 3.13 pounds of dry wheat equivalent per minute. The macerated wheat was continuously fed to a dispersing loop, consisting of a reservoir and two centrifugal pumps. The dispersing medium was a dilute dispersion of endosperm fed back from the second centrifugal screen. The dispersion was maintained at pH 3.0 by a controlled input of hydrochloric acid.

The dispersion was withdrawn continuously from the dispersing loop into the first stage of the two-stage centrifugal screen separating system. Mercone scroll-screen centrifuges were employed in both stages. The dispersed endosperm was withdrawn from the first screen centrifuge and the separated fraction of husk-germ-schnitt and residual endosperm was dispersed with water in a second stage dispersing loop. This dispersion was separated by the second stage centrifugal screen into a husk-germ-schnitt stream and a dilute dispersion of endosperm. The stream of dilute endosperm was passed through a bar slot refining screen to remove husk splinters and small germ and then directed as dispersing medium into the first stage dispersing loop.

The effective screen openings in the separating system were as follows: First stage centrifuge — 97 by 170 $\mu$m conical slot; Second stage centriguge — 81 $\mu$m diameter round; Refining screen — 71 $\mu$m bar-slot.

The pH of the extracted endosperm was adjusted with sodium hydroxide to 6.5, 6.2 and 6.4 in Runs 1, 2 and 3, respectively. The input of water to the macerate dispersing system was variously adjusted so that the solids content of the endosperm extracts were 16.0, 15.3 and 18.6 percent in Runs 1, 2 and 3, respectively.

A bench-scale extract (Lab Run) of a mixture of hard spring and winter wheats was prepared by the general procedure described in copending application by Rodgers, et al., "Hydroprocessing of Wheat," Ser. No. 154,532, supra.

The husk and germ were disengaged from the endosperm at 21.5 percent macerate solids and recovery of endosperm was at 16.7 percent solids. Since the bench-scale separation was not optimally adapted to operation at this relatively high level of solids, it was observed that a small amount of gluten protein was lost to the husk and germ fraction during separation of the endosperm.

All four samples of endosperm were freeze dried and hand crushed through a 1,000 $\mu$m sieve to avoid mechanical damage to the endosperm.

Three dry-milled flours were selected for comparison. The No. 1 flour indicated in the tables is an unbleached flour derived from the same type of hard wheat blend used in obtaining the first three samples above (Runs 1 – 3). The No. 2 flour similarly corresponds to the endosperm prepared in the laboratory batch extraction (Lab Run). Pillsbury's Best is an all-purpose blended flour.

Water dispersions of the freeze-dried endosperms and flours were examined microscopically with respect to extent of breakdown of cellular structure, fraction of starch granules, stainability of starch granules by congo red and appearance of starch granules in polarized light.

Methods for Determining Starch Damage

About one milligram (mg) of the powdered material was gently dispersed in 0.06 milliliters (ml) of distilled water, mixed with 0.01 ml of 0.1 percent aqueous congo red on a microscope slide and covered with a 22 × 22 millimeter (mm) cover slip. This amount of dispersion provided a mount in which particles were not altered by capillary compression.

The mounts were variously examined at 100 and 450 magnification using bright field, dark contrast phase illumination and filter-polarized light. The condition of the starch and cellular organization in dry-milled flours was quickly evident, but at least 15 to 20 fields of hydroprocessed endosperm were examined to assess trace evidence of starch damage and residual cellular organization.

An initial study on dry-milled flour with a high incidence of starch damage established the following relations between permeability of starch granules to congo red, reaction to polarized light and granule fracture:

1. Generally, starch granules with no visible fracture do not stain with dilute congo red and are anisotropic, i.e., are birefringent to polarized light. Very rarely, granules with no apparent physical disruption stain with congo red and are isotropic or partially anisotropic. An isotropic condition is interpreted as due to an alteration in the native structure of the starch granule.

2. Naturally malformed starch granules with creases and abnormal shapes usually do not stain with congo red and are anisotropic.

3. Fractured granules or granules with slight discontinuities in the outer boundary invariably stain with congo red. When subsequently observed in polarized light, such stained granules invariably are isotropic or only partially anisotropic. Partially anisotropic granules exhibit partial crosses or, more often, slight blips of light on the outer boundary.

4. Conversely to item (3), partially anisotropic granules, initially detected in polarized light, invariably are found to be colored by congo red when subsequently viewed in bright field.

In view of these correlations, starch damage was assessed in terms of granule rupture and stainability by congo red and subsequently checked by appearance in polarized light. It is estimated that the detection of congo red stainability is better than one part in 10,000 under the conditions of inspection. Since the differences between the endosperm (runs 1–3 and lab run) and dry-milled flours are at least a few orders of magnitude, the comparisons have been expressed in qualitative terms, as explained in Table 3.

The amount of damaged starch can also be estimated enzymatically. Wheat starch physically damaged during milling operations is more susceptible to digestion by $\beta$-amylase than native starch. This relation is the basis of a test commonly used for indexing the extent of starch damage in flours. In this test, the amylolytic enzymes native to flour are inactivated by refluxing with alcohol, and then the formation of maltose in the presence of added $\beta$-amylase under standardized conditions is measured. Method No. 76–30A of the American Association of Cereal Chemists was employed.

Particle Size of Protein Bodies in Wheat Product

Particle size distribution of gluten protein bodies was determined in a 15 percent solids extract of endosperm prepared as in Runs 1–3 as described above. 0.01 ml of endosperm extract and 0.01 ml of 0.1 percent aqueous fast green were gently mixed with 0.06 ml of distilled water on a microscope slide and covered with a 22 × 22 mm cover slip. Mixing, by briefly stirring with the loop and tilting the drop was minimal to avoid aggregation of protein particles. This mount was sufficiently deep so that only protein particles larger than around 400 μm were significantly compressed. Staining with fast green clearly distinguished protein particles over 10 μm. Stained particles less than 10 μm were of low frequency. Since they contributed insignificantly to the total mass of protein, they were arbitrarily excluded in accounting the frequency distribution. The mount was examined by bright field illumination at 100x magnification, using a calibrated occular reticle. Particles were randomly selected for measurement by scanning the slide horizontally from edge to edge along lines roughly defining 25, 50 and 75 percent of the vertical dimension of the slide. Fields were advanced in steps of about one mm by abrupt movement of the mechanical stage to create an optical blur. In each field, the protein particle whose center was closest to the midpoint of the zero line of the reticle scale was selected for measurement.

The size of the randomly oriented, irregularly shaped particles was measured as the distance on the horizontally positioned reticle scale subtended by two verticle lines intercepting the extreme edges of the particles. 100 particles, exluding a negligible incidence of particles less than 100 μm, were measured.

Bread Baking

The baking tests using the endosperm products were conducted from doughs prepared from the following dry ingredient mix:

| INGREDIENT | PER CENT | GRAM |
|---|---|---|
| Endosperm product | 88.50 | 132.80 |
| Sugar | 4.50 | 6.75 |
| Shortening | 2.75 | 4.12 |
| Nonfat dry milk | 1.70 | 2.50 |
| Salt | 1.60 | 2.40 |
| Emulsifier | 0.75 | 1.12 |
| Yeast food | 0.20 | 0.30 |
|  | 100.00 | 149.99 |

The dry ingredients together with water equivalent to 60 percent of the weight of the dry mix, and 4.5 grams (g) of yeast were added to the bowl of a spindle mixer and mixed for two minutes. The dough was placed in a 1½ quart beaker and fermented until the center of the dough was even with the top of the beaker (about 10 minutes at 88° F.) The dough was scaled into six ounce pieces and placed in pup pans having the following dimensions: 3-⅛ × 5-⅝ × 2-¼ inches. The dough was proofed to the top of the pans at 102° F. and then baked 20 minutes at 390° F.

Composition of Endosperm Product and Dry-milled Flours

Table 1 compared gross compositions of the endosperm products with flours dry-milled from comparable wheat mixes.

Table 1

Comparison of Composition of Hydroprocessed Endosperm and Dry-Milled Flours.[a]

|  | Hydroprocess Endosperm[b] | | | | Dry-Milled Flour | | |
|---|---|---|---|---|---|---|---|
|  | Run 1 | Run 2 | Run 3 | Lab Run | No. 1 | No. 2 | Pillsbury's Best |
| Moisture (%) | 3.87 | 4.64 | 3.52 | 3.20 | 12.3 | 13.2 | 10.6 |
| Protein, Nx5.7 (%) | 12.8 | 12.8 | 13.5 | 12.4 | 12.7 | 14.2 | 11.1 |
| Soluble protein, Nx5.7 (%) | 2.42 | 2.47 | 2.44 | 3.16 | 2.72 | 2.80 | 3.28 |
| Lipid |  |  |  |  |  |  |  |
| ethyl ether extract (%) | 0.37 | 0.37 | 0.31 | 0.24 | 1.25 | 1.45 | 1.15 |
| chloroform extract (%) | 0.48 | 0.53 | 0.44 | 0.30 |  |  |  |
| Maltose value (mg/10g) | 125 | 157 | 113 | 133 | 303 | 457 | 467 |
| Ash (%) | 1.74 | 1.73 | 1.73 | 1.80 | 0.49 | 0.40 | 0.48 |

[a]Excepting moisture, compositions are expressed on a dry basis.
[b]Pilot Runs 1, 2 and 3 represent extractions from wheat comparable to No. 1 flour. The Lab Run is comparable to No. 2 flour.

The ether-extractable lipid content of the pilot plant and laboratory extracted endosperms averaged 23 and 19 percent, respectively, of the corresponding No. 1 and No. 2 flours. The low lipid content of the endosperm product is attributed to more complete separation of husk and germ fractions than in dry-milling. The chloroform-extractable lipid content of endosperm is around 0.3 to 0.5 percent, while the concentration in the combined husk and germ fractions range 7.4 to 8.2 percent dry basis. Mill germs and brans, representing impure fractions from dry milling, commonly average around 11 percent and 4.5 percent dry basis ether extractable lipid, respectively.

The maltose values of the pilot plant and laboratory extracted endosperms averaged 44 percent and 29 percent, respectively, of the corresponding No. 1 and No. 2 flours. The maltose values index the extent of autolytic digestion of starch by amylolytic enzymes native to flour. Consequently, the low values for hydroprocessed endosperm may reflect either reduced susceptibility of the starch to enzymatic action or reduced activity of the enzymes, particularly α-amylase. In contrast to β-amylase, α-amylase is believed to attack undamaged starch to a limited extent. In view of other evidence of a low incidence of damaged starch in this endosperm product, it is likely that this is a major factor limiting the maltose value.

The concentration of ash in the endosperm products averaged 357% of that in the flours. This is due largely to generating sodium chloride in process. Some selective translocation of minerals from husk and germ tissues may also be involved.

Structure of Endosperm Product and Dry-Milled Flours

Microscopic examination of freeze-dried endosperm products dispersed in water showed that the cellular structure of the endosperm was completely disintegrated (Table 2). The starch appeared as free granules, substantially unassociated with protein.

Table 2

Relative Incidence of Damaged Starch and Intact Endosperm Cells in Hydroprocessed Endosperm and Dry-Milled Flours.

| | Starch Damage | | | Endosperm Cells[d] |
|---|---|---|---|---|
| | Granule Fracture[a] | CR-PL Reaction[b] | Enzymatic Test[c] % | |
| Hydroprocess Endosperm | | | | |
| Pilot plant endosperm, run 1 | none | trace | 0 | trace |
| Pilot plant endosperm, run 2 | none | trace | 3.38 | trace |
| Pilot plant endosperm, run 3 | none | trace | 0 | none |
| Laboratory endosperm, lab run | none | none | 2.65 | none |
| Dry-Milled Flour | | | | |
| Hard wheat, No. 1 | many | many | 8.54 | predominent |
| Hard wheat, No. 2 | many | many | 7.19 | predominent |
| All purpose, Pillsbury's Best | many | many | 9.15 | predominent |

[a] Starch granules broken or showing discontinuity in optically refractive boundary by microscopic examination.
[b] Starch granules stained with congo red and either isotropic or partially anisotropic to polarized light. Trace: incidence less than one granule in at least 10,000 granules, estimated from examination of many microscopic fields. Many: many reactive granules seen in every microscopic field.
[c] Index based on susceptibility of damaged starch to digestion by β-amylase. American Association of Cereal Chemists Method No. 76-30A.
[d] Trace: intact endosperm cells rarely seen by microscopic examination. Estimated that less than 0.1% of starch is contained in intact cells. Predominent: estimated that over 50% of starch is contained in intact cells.

The gluten protein was physically metamorphosed from the matrix structure native to the endosperm cell and appeared as irregularly shaped particles, containing very little occluded starch. The occluded starch was almost exclusively small granules. Although the particles were irregular in outline, they were smoothly contoured as compared to the sharply edged, conchoidal shapes of wedge protein fragments characteristic of dry-milled flours.

The incidence of husk (branny) tissue in the endosperm products was very low. It was necessary to examine many microscopic fields to find identifiable fragments of husk. The fragments were mostly limited to the brush or hair-like structures which append to the apex of the wheat kernel. These structures apparently are narrow enough to slip through the disengaging screens. It is estimated that 95 to 99 percent of the husk tissue was removed by the extraction process.

In contrast to the endosperm products, most of the endosperm of flours dry-milled from similar or other wheat mixes was contained in intact or fragmented cells (Table 2). Although free starch granules were numerous, most of the starch was associated with the cellular structure or embedded in fragments of matrix protein. Many fragments of husk and some germ tissues were observed.

The incidence of starch damage in the hydroprocess endosperm products, as indexed by granule fracture, permeability to congo red and isotropy in polarized light was extremely low. Fractured granules were never observed and it was necessary to search many 100x microscopic fields to find a granule stained with congo red. As discussed herebefore, granules stainable with congo red invariably were isotropic or only partially anisotropic. Numerous fractured granules and intact isotropic or partially anisotropic granules stained with congo red were seen in every field of the dry-milled flours.

Starch damage, as indexed by digestion by β-amylase, was not detectable in Runs 1 and 3, but low values were obtained on Run 2 and the Lab Run. This partial disparity with the microscopic observations is not understood since, although the observations were qualitative, the endosperm extracts were indistinguishable. However, the extent of enzymatically measured starch damage in the three flours was at least twice that in any of the endosperm products. These observations are in accord with the maltose values noted in Table 1.

Metamorphosis of Gluten Protein

Physical metamorphosis of gluten protein from the native state in the endosperm cell is particularly evident from the size of the protein particles. Some particles are substantially larger than the cells of origin. While, depending on tissue stratum, endosperm cells may typically range 60 to 200 μm long, some of the protein particles are larger in random dimension. Analysis of distribution of particle size was made on an in-process endosperm dispersion, as shown in Table 3.

FIG. 1 depicts the distribution of size among 100 measured particles of gluten protein in a pilot plant endosperm extract from a hard wheat, containing 15 percent solids at pH 3.0. The plot is made on probability coordinates. Many qualitative observations on other hydroprocess endosperm products affirm that the distribution is of similar character.

The statistical parameters of these data are summarized in Table 3.

Table 3

Distribution of Size of Protein Particles in Endosperm Product.

| Particle Size | | | | | |
|---|---|---|---|---|---|
| Mean | Median | 10-90 Percentile | Range | Standard Deviation | Standard Error |
| μm | μm | μm | μm | μm | % |
| 101 | 88 | 30-170 | 15-300 | 56 | 5.6 |

Figure 2:
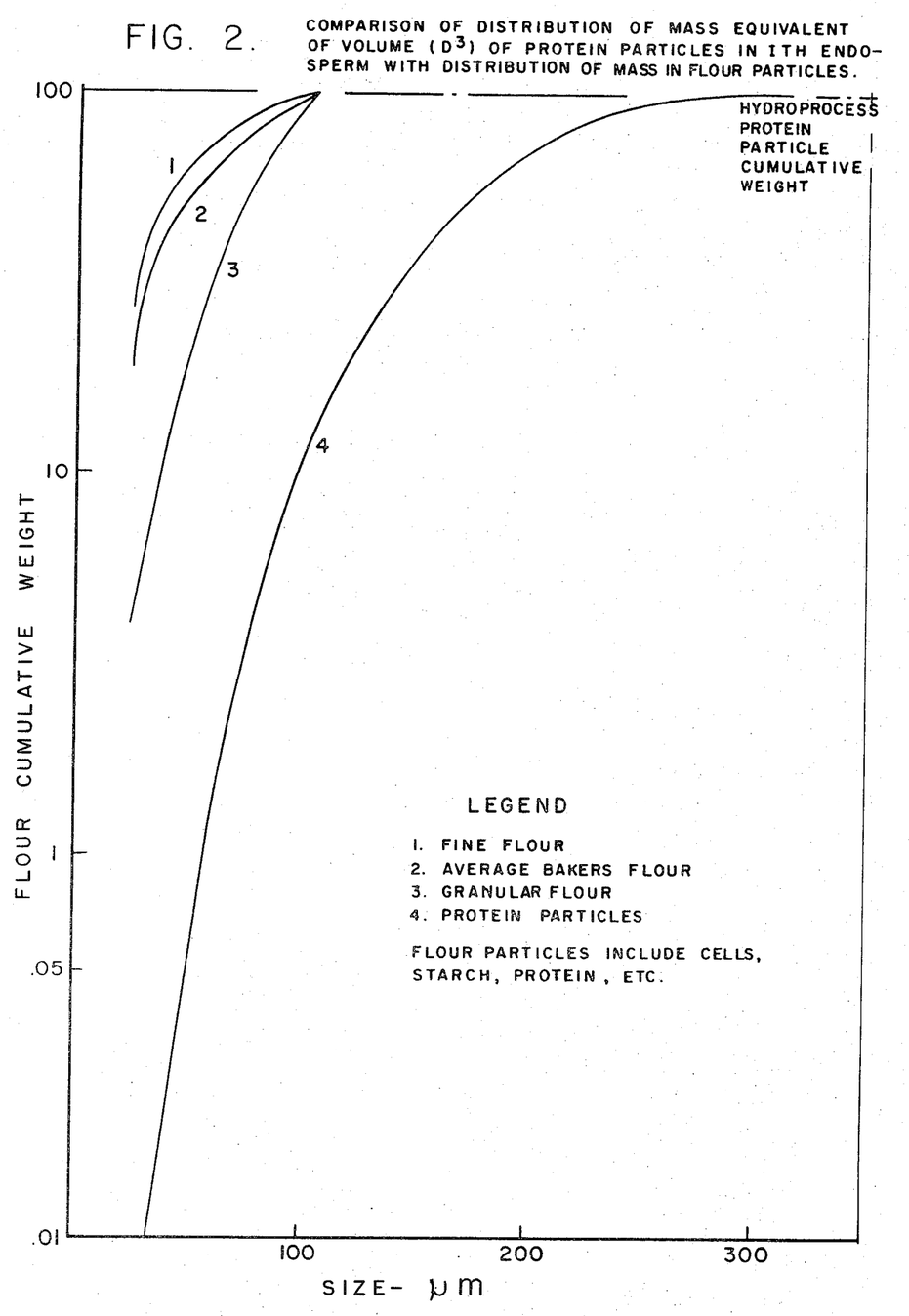
FIG. 2 is a graph of cumulative distribution of weight of protein in relation to size of protein particles in this product compared with the cumulative distribution of weight of all particles of flour in relation to size of all particles in flours dry-milled to varying fineness. A fine flour, a baker's flour and a granular flour were utilized in this comparison. This graph is drawn on semi-log coordinates. In the case of the hydroprocess product, the relative distribution of mass is indexed as the cube function of the randomly measured dimension of the germ is removed from the flour to avoid odor and flavor problems attending oxidation of the oil. The aleurone is discarded with the husk because of the difficulty involved in breaking the stron bond between the husk and aleurone tissues.

FIG. 2 represents the data of FIG. 1 in terms of the distribution of mass equivalent of the volume of the particles estimated as the cube of the randomly measured dimension ($D^3$). On comparing FIGS. 1 and 2, it is seen, for example, that while particles 100 μm or larger comprise only 40 percent of the population, they account for about 90 percent of the protein mass. A qualified perspective on metamorphosis of gluten protein is provided in FIG. 2, where the mass versus size distribution of protein particles in the hydroprocess endosperm product is compared with data on particles in variously milled flours adapted from Kent-Jones and Amos, Modern Cereal Chemistry, Food Trade Press Ltd., (1967). Note that the comparison is with total flour particles, including cells, starch, protein, aggregates, etc.

Baking Properties of the Endosperm Product

Table 4 describes the breads baked from the product of this invention.

and unoccluded by protein. When viewed under polarized light, substantially all of the starch granules were anisotropic.

Table 4

Breads Formulated with Hydroprocess Endosperms

| Hydroprocess Endosperm | Loaf Volume | Loaf Weight | Specific Volume | Crust Symmetry | Crust Break & Shred | Grain I | Grain II | Crumb Texture Hardness | Crumb Texture Elasticity |
|---|---|---|---|---|---|---|---|---|---|
| | cc | g | cc/g | 1–5 | 1–5 | 1–5 | 1–5 | 1–5 | 1–5 |
| Run 1 | 700 | 160 | 4.38 | 3.3 | 3.3 | 3.0 | 3.5 | 3.0 | 3.0 |
| Run 2 | 725 | 160 | 4.53 | 3.5 | 3.3 | 2.8 | 3.5 | 3.0 | 3.0 |
| Run 3 | 675 | 160 | 4.22 | 3.3 | 3.0 | 2.5 | 3.5 | 3.0 | 3.0 |
| Lab Run | 675 | 160 | 4.22 | 3.0 | 2.5 | 2.5 | 3.0 | 3.0 | 3.0 |

As indicated in Table 4, the physical characteristics and eating quality of breads produced from the hydroprocessed endosperms were quite comparable in all respects to conventional bread. The comparison is quite favorable, considering that the doughs were processed under fixed conditions, with no attempt to adjust conditions optimally for each product as commonly practiced.

EXAMPLE II 400 g of hard red wheat were combined with 1,000 ml of distilled water and 600 g of tap water ice in a 5,800 ml capacity Waring Blendor (Model CB-4). The wheat was ground for 5 minutes on the low speed setting. An additional 600 g of tap water ice were added to the mixture and the grinding, on low speed, was continued for an additional five minutes. The ice maintained the temperature of the wheat-water mixture below 68° F. until the last one-half minute when a temperature of 70° F. was attained.

The pH of the wheat product was adjusted from pH 7.0 to pH 5.8 with 0.1 N hydrochloric acid. The wheat product was then sieved using a Sweeco laboratory sifter equipped with a No. 80 (177 μm) screen. Most of the husk was retained on the screen and the starch and gluten were washed through the screen. A foam remained on the Sweeco screen after sieving and was washed through the screen by spraying with an additional 250 ml of distilled water.

The husk which remained on the screen was collected and dried at 115° F. in an air circulating oven. The filtrate was frozen, using a platetype freezer, and then dried in a Stokes laboratory freeze dryer. The wheat product containing the endosperm and the germ was then ground in a ball mill for approximately 15 minutes.

The hydromilled wheat product obtained had a brownish-yellow color and a polyphenol oxidase activity of 18.8 and a pH of 6.4. There was no pretreatment to reduce the polyphenol oxidase activity.

The wheat product contained about 1 percent by weight fiber (the amount of fiber can be reduced to 0.2 percent or less by using a finer screen) and about 2 percent ash when analyzed on the basis of the original moisture content of 11.24 percent.

Microscopic examination of the wheat product showed that the cellular structure of the endosperm was completely disintegrated excepting some minor vestiges of cellular organization from the aleurone layer. The starch granules were all intact, ungelatinized The gluten protein was present in homogeneous, smoothly contoured bodies containing only minor amounts of occluded starch bodies. By visual determination, 90 percent of the protein bodies were larger than 75 μm.

The resulting wheat product was used in the following recipe for baking bread:

| INGREDIENT | PER CENT | GRAM |
|---|---|---|
| Unbleached wheat product (3% moisture) | 49.11 | 88.7 |
| Crisco shortening | 2.77 | 5.0 |
| Salt | .553 | 1.0 |
| Sugar | 3.60 | 6.5 |
| Dry milk | 3.32 | 6.0 |
| Compressed yeast | 1.11 | 2.0 |
| Arkady yeast food | .137 | .25 |
| Water (60% absorption on basis of 12% moisture product) | 39.40 | 71.3 |
| | 100.000 | 180.75 |

The wheat product, shortening, salt, sugar, dry milk and yeast were combined. The compressed yeast was added to room temperature tap water with stirring until dispersed. The total dry ingredients and the yeast suspension were combined in a Hobart C-100 mixer equipped with a McDuffee bowl and mixed on low speed for 6 minutes. The sides of the mixing bowl were scraped down periodically during mixing. The resulting dough was fermented at 90 percent relative humidity and 90° F. for two hours. Then 140 grams of the dough were weighed into a pup loaf pan and proofed at 90 percent relative humidity and 100° F. for 1 hour. The dough was then baked at 425° F. for approximately 15 minutes.

The dough utilizing the wheat product had good gluten development and proofed well. The bread baked with the wheat product of this invention had good volume. The crumb structure and the flavor of the bread was good and the color of the interior of the loaf was a yellowish-tan.

EXAMPLE III

Four hundred grams of hard red wheat were heat treated in 4,000 ml of boiling tap water for 30 seconds. The surface heated wheat was immediately collected on a U.S. Standard No. 40 sieve, then flushed with cold tap water for approximately 2 minutes until cool. The heat treated wheat and 1,000 ml distilled water were combined in a 5,800 ml capacity Waring Blender bowl and the contents ground for 6 minutes using a Model CB-4 Waring Blender on low speed setting. 475 g of distilled ice water were added during grinding to maintain a temperature of approximately 72° F. The ground slurry was sieved with a Sweeco vibratory sifter equipped with a No. 230 (63 μm) screen. The foam residue which remained on the Sweeco screen during sieving was washed through by spraying with an additional 250 ml distilled water. The filtrate was adjusted to pH 5.6 using a p.1 N hydrochloric acid solution, frozen in a plate-type freezer, then dried in a Stokes laboratory freeze dryer. The dried wheat product was placed in a polyethylene bag and crushed by hand until a homogeneous powder resulted. The husk residue which remained on the Sweeco screen was collected and dried in an air circulating oven.

Microscopic examination of the wheat product showed that the cellular structure of the endosperm was completely disintegrated and that the starch granules were intact, ungelatinized and unoccluded by protein. The gluten protein was present in homogeneous, smoothly contoured bodies containing only minor amounts of occluded starch bodies. By visual determination, 90% of the protein bodies were larger than 75 μm. The polyphenol oxidase activity was reduced to 5.3 units.

The resulting wheat product was adjusted to 12 percent moisture combined with 0.0595 percent benzoyl peroxide and then used in the following recipe (60 percent moisture absorption) for baking bread.

| INGREDIENTS | PER CENT | GRAM |
|---|---|---|
| Bleached wheat product (12% moisture) | 54.23 | 49.0 |
| Crisco shortening | 2.77 | 2.5 |
| Salt | .553 | .5 |
| Sugar | 3.60 | 3.25 |
| Dry milk | 3.32 | 3.0 |
| Compressed yeast | 1.11 | 1.0 |
| Arkady yeast food | .137 | .125 |
| Water (60% absorption on basis of 12% moisture product) | 34.28 | 31.0 |
| | 100.000 | 90.375 |

The wheat product, shortening, salt, sugar, dry milk and yeast food were combined. The compressed yeast was dispersed in room temperature tap water. The total dry ingredients and the water with yeast dispersed therein were combined in a Farinograph equipped with a 50 g bowl jacket heated to 30° C. and mixed on a low speed for one minute. After one minute of mixing on low speed, the sides of the mixing bowl were scraped down and then the ingredients were mixed for 6 minutes at high speed. The resulting dough was fermented at 90 percent relative humidity and 90° F. for 2 hours, then 70 g of the dough were weighed into a divided pup loaf pan and proofed at 90 percent relative humidity and 100° F. for 1 hour. The dough was then baked at 425° F. for approximately 15 minutes.

The dough from the wheat product with the benzoyl peroxide added was somewhat sticky, had good gluten development and good proof. The volume of the loaf was good as was the crumb structure.

Products similar to this example were made by drying the endosperm extract. These products had increased yield and improved lysine content over conventional dry-milled flour because of the inclusion of soluble albumin and globular proteins from the aleurone layer and the germ.

What is claimed is:

1. A wheat product wherein the normal cellular structure of the endosperm is substantially completely disrupted produced by a process during which the endosperm is dispersed in an aqueous medium, the starch granules are maintained in a substantially intact and ungelatinized form and the gluten protein is dispersed and wherein the husks are removed from said product; said wheat product comprising:
   a. wheat starch granules that are substantially intact, ungelatinized and unoccluded by gluten protein;
   b. homogeneous, smoothly contoured gluten protein particles containing only minor amounts of occluded starch; said gluten protein being substantially undenatured with respect to doughing function.

2. The product of claim 1 wherein substantially all of the starch granules are impermeable to congo red.

3. The product of claim 1 wherein the starch granules resist attack by β-amylase enzymes.

4. The product of claim 1 dispersed in an aqueous medium.

5. The product of claim 1 in a dried form.

6. The product of claim 1 wherein substantially all of the starch granules are anisotropic when viewed microscopically in polarized light.

7. The product of claim 6 wherein at least 80 percent by weight of said gluten protein is contained in particles having sizes from 75 μm to 300 μm.

8. The product of claim 6 wherein at least 90 percent by weight of said gluten protein is contained in particles more than 50 μm in randomly measured dimension.

9. The product of claim 8 containing substantially all of the germ and aleurone.

10. The product of claim 9 containing from about 0.005 to 4.0 parts by weight oil per part by weight water.

11. The product of claim 6 wherein at least 90 percent by weight of said gluten protein is contained in particles more than 75 μm to 300 μm in randomly measured dimension.

12. The product of claim 11 wherein the starch damage as indexed by susceptibility to hydrolysis by β-amylase, according to Method No. 76-30A of the American Association of Cereal Chemists, is less than 4.5%.

13. The product of claim 11 containing substantially no germ or aleurone.

14. The product of claim 11 wherein the ether-extractable lipid content is less than 0.5 percent by weight of the product.

* * * * *

United States Patent [19]

Sahaydak

[11] 3,832,473
[45] Aug. 27, 1974

[54] MAINTENANCE OF FLAVOR INTEGRITY IN PRESSED MINT ASSORTMENTS

[75] Inventor: Miroslaw Sahaydak, Great Neck, N.Y.

[73] Assignee: Warner-Lambert Company, Morris Plaines, N.J.

[22] Filed: Mar. 8, 1972

[21] Appl. No.: 232,955

[52] U.S. Cl................. 426/175, 426/214, 426/512
[51] Int. Cl............................ A23l 1/26, A23g 3/00
[58] Field of Search........... 99/134, 140 R; 426/214, 426/175

[56] References Cited
UNITED STATES PATENTS
3,041,180   6/1962   Swisher............................... 99/140

OTHER PUBLICATIONS

Skuses Complete Confectioner 13th ed., W. J. Bush & Co., Ltd., London, England, 1957, pp. 256–261.
Richmond, Choice Confections Manufacturing Methods and Formulas, Manuf. Conf. Pub. Co. Oak Park, Ill., pp. 358–359.

Primary Examiner—A. Louis Monacell
Assistant Examiner—J. M. Hunter
Attorney, Agent, or Firm—Albert H. Graddis; Frank S. Chow; Anne M. Kelly

[57] ABSTRACT

Flavor integrity in an assortment of pressed mints packaged with different flavors adjacent to one another in a unitary package, is maintained by utilizing a solid particulate emulsion form of the flavor oil. The flavor oil is emulsified in a mixture of corn syrup solids, an emulsifier, and either glycerol, a nontoxic glycol or mixtures thereof; the molten mixture obtained is extruded into a cold fluid to obtain a solidified filament which is broken into small particles. From 1 percent to 10 percent, preferably from 2.25 percent to 9 percent by weight, based on the total weight of the formulation, of a differently flavored emulsion is incorporated into each pressed mint. A preferred assortment contains, in a unitary package, pressed mints flavored with a solid particulate emulsion of orange oil, lemon oil, lime oil, cherry essence (imitation), oil of wintergreen, pineapple essence (imitation), grapefruit oil and peppermint oil, each mint in the assortment being flavored with one of the aforementioned flavors.

7 Claims, No Drawings